(12) United States Patent
Okamae et al.

(10) Patent No.: US 11,264,922 B2
(45) Date of Patent: Mar. 1, 2022

(54) PIEZOELECTRIC DRIVE DEVICE AND ROBOT

(71) Applicant: SEIKO EPSON CORPORATION, Tokyo (JP)

(72) Inventors: Yudai Okamae, Chino (JP); Tomohisa Iwazaki, Shimosuwa-machi (JP); Yutaka Arakawa, Hara-mura (JP)

(73) Assignee: SEIKO EPSON CORPORATION, Tokyo (JP)

(*) Notice: Subject to any disclaimer, the term of this patent is extended or adjusted under 35 U.S.C. 154(b) by 20 days.

(21) Appl. No.: 17/002,799

(22) Filed: Aug. 26, 2020

(65) Prior Publication Data

US 2021/0067060 A1 Mar. 4, 2021

(30) Foreign Application Priority Data

Aug. 27, 2019 (JP) .............................. JP2019-154406

(51) Int. Cl.
| | |
|---|---|
| *H02N 2/10* | (2006.01) |
| *B41J 23/00* | (2006.01) |
| *B25J 9/12* | (2006.01) |
| *H02N 2/12* | (2006.01) |
| *H02N 2/00* | (2006.01) |
| *B25J 18/00* | (2006.01) |

(Continued)

(52) U.S. Cl.
CPC ............ *H02N 2/103* (2013.01); *B25J 9/0009* (2013.01); *B25J 9/12* (2013.01); *B25J 11/00* (2013.01); *B25J 18/00* (2013.01); *B41J 23/00* (2013.01); *H02N 2/001* (2013.01); *H02N 2/004* (2013.01); *H02N 2/006* (2013.01); *H02N 2/12* (2013.01); *H02N 2/14* (2013.01)

(58) Field of Classification Search
CPC .......... H02N 2/103; H02N 2/12; H02N 2/004; H02N 2/006; H02N 2/001; H02N 2/14; B25J 9/12; B25J 9/0009; B25J 11/00; B25J 18/00; B41J 23/00
See application file for complete search history.

(56) References Cited

U.S. PATENT DOCUMENTS

2018/0323729 A1\* 11/2018 Arakawa ............... H02N 2/0015
2021/0067061 A1\* 3/2021 Nakanishi .............. H02N 2/006

FOREIGN PATENT DOCUMENTS

| JP | 2005333700 A | 12/2005 |
|---|---|---|
| JP | 2016063712 A | 4/2016 |
| JP | 2019068545 A | 4/2019 |

\* cited by examiner

*Primary Examiner* — Emily P Pham
(74) *Attorney, Agent, or Firm* — Gang Yu

(57) ABSTRACT

A piezoelectric drive device includes a rotor which has an output section for outputting a rotational force and a transmission section disposed on an outer periphery of the output section, and rotates around a rotational axis, and a vibrating part which has a piezoelectric element, and rotates the rotor due to a deformation of the piezoelectric element. The transmission section has a first portion and a second portion different from each other in position in a radial direction from the output section toward the transmission section, the first portion is coupled to the output section, the second portion is higher in Young's modulus than the first portion, the second portion is higher in mass per unit volume than the first portion, and the vibrating part makes contact with the transmission section at a position overlapping the second portion in a plan view from an axial direction of the rotational axis.

13 Claims, 11 Drawing Sheets

(51) Int. Cl.
*H02N 2/14* (2006.01)
*B25J 9/00* (2006.01)
*B25J 11/00* (2006.01)

PIEZOELECTRIC DRIVE DEVICE AND ROBOT

The present application is based on, and claims priority from JP Application Serial Number 2019-154406, filed Aug. 27, 2019, the disclosure of which is hereby incorporated by reference herein in its entirety.

BACKGROUND

1. Technical Field

The present disclosure relates to a piezoelectric drive device and a robot.

2. Related Art

In JP-A-2016-063712, there is described a device provided with a vibrating body which uses a deformation of a piezoelectric element to make an elliptical motion, and a driven body driven by contact with the vibrating body. In this device, the driven body is formed mainly of stainless steel.

In the device described above, from the viewpoint of reduction in power consumption and so on, reduction in weight of the driven body is desired. However, when reducing the weight of the driven body, the driven body becomes easy to vibrate, and there is a possibility that it becomes unachievable to efficiently transfer a drive force from the vibrating body to the driven body.

SUMMARY

According to an aspect of the present disclosure, there is provided a piezoelectric drive device. The piezoelectric drive device includes a rotor which has an output section configured to output a rotational force and a transmission section disposed on an outer periphery of the output section, and rotates around a rotational axis, and a vibrating part which has a piezoelectric element, and rotates the rotor due to a deformation of the piezoelectric element. The transmission section has a first portion and a second portion which are different from each other in position in a radial direction from the output section toward the transmission section, the first portion is coupled to the output section, the second portion is higher in Young's modulus than the first portion, the second portion is higher in mass per unit volume than the first portion, and the vibrating part makes contact with the transmission section at a position overlapping the second portion in a plan view from an axial direction of the rotational axis.

DESCRIPTION OF EXEMPLARY EMBODIMENTS

A. First Embodiment

Figure 1:
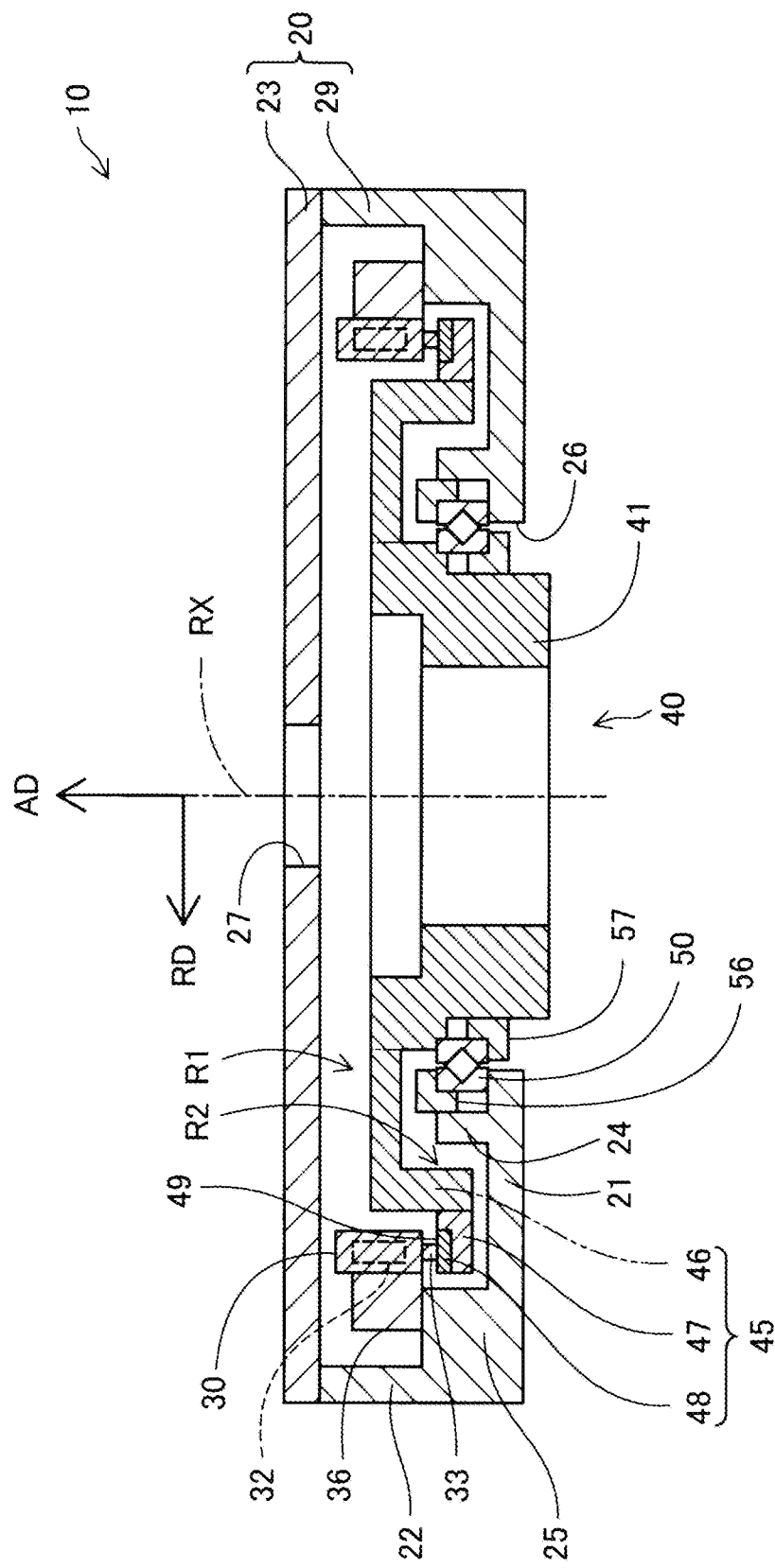
FIG. 1 is a first explanatory diagram showing a schematic configuration of a piezoelectric motor according to a first embodiment.
Figure 2:
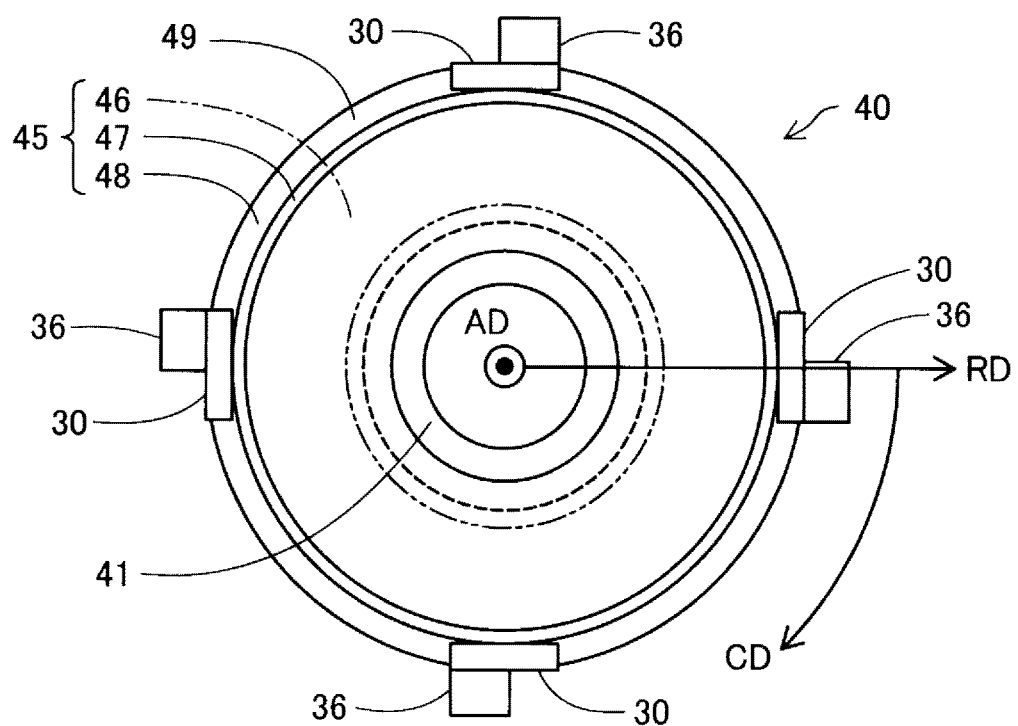
FIG. 2 is a second explanatory diagram showing a schematic configuration of the piezoelectric motor according to the first embodiment.

FIG. 1 is a first explanatory diagram showing a schematic configuration of a piezoelectric motor 10 in a first embodiment. FIG. 2 is a second explanatory diagram showing a schematic configuration of the piezoelectric motor 10 in the first embodiment. The piezoelectric motor 10 in the present embodiment is provided with a case 20 which zones an outer shape of the piezoelectric motor 10, piezoelectric actuators 30 housed inside the case 20, a rotor 40 driven by the piezoelectric actuators 30, and a bearing 50 for rotatably supporting the rotor 40. The piezoelectric actuators 30 are each provided with piezoelectric elements 32, and rotate the rotor 40 using two-dimensional deformation of the piezoelectric elements 32. The rotation of the rotor 40 is transmitted to the outside of the piezoelectric motor 10 via an output section 41. The piezoelectric motor 10 can also be provided with an encoder for detecting a rotational direction, a rotational angle, and rotational speed of the rotor 40 with respect to the case 20. The encoder can be an optical encoder, or can also be a magnetic encoder. It should be noted that the piezoelectric motor 10 is referred to as a piezoelectric drive device or an ultrasonic motor in some cases. The rotor 40 is referred to as a driven part in some cases.

The case 20 is constituted by a lower case 29 and a lid part 23. The lower case 29 is provided with a bottom surface part 21, and a side surface part 22 disposed so as to stand from an outer circumferential edge of the bottom surface part 21 toward the lid part 23. At the center of the bottom surface part 21, there is disposed an opening part 26 through which the output section 41 penetrates. On the outer periphery of the opening part 26 of the bottom surface part 21, there is disposed a protruding part 24 to which an outer race of the bearing 50 is coupled. Inside the outer circumferential edge of the bottom surface part 21, there is disposed a step part 25 to which the piezoelectric actuators 30 are coupled. Coupling of the bearing 50 and the piezoelectric actuators 30 will be described later. The lid part 23 is coupled to an upper end portion of the side surface part 22 of the lower case 29 with screws after the bearing 50, the rotor 40, and the piezoelectric actuators 30 are coupled to the lower case 29. The lid part 23 is provided with a through hole 27 through which wiring or the like passes.

The piezoelectric actuators 30 are each fixed to the step part 25 of the case 20 via a fixation member 36. The piezoelectric actuators 30 are each provided with the piezoelectric elements 32 described above and a tip part 33 opposed to a contacted surface 49 of the rotor 40. By supplying the piezoelectric elements 32 with AC currents, the piezoelectric elements 32 deform to cause the tip part 33 to vibrate so as to draw an elliptical orbit. Due to the vibration, the tip part 33 repeatedly touches the contacted surface 49 of the rotor 40 to apply a drive force to the rotor 40. In the present embodiment, the piezoelectric actuators 30 are fixed to the fixation member 36 with screws. The fixation member 36 is fixed to the step part 25 with at least either one of screws and an adhesive. It should be noted that a specific configuration and an operation of the piezoelectric actuators 30 will be described later.

In FIG. 2, there is shown a positional relationship between the piezoelectric actuators 30 and the rotor 40 viewed from the lid part 23 toward the bottom surface part 21. The piezoelectric motor 10 in the present embodiment is provided with four piezoelectric actuators 30. The four piezoelectric actuators 30 are disposed at regular intervals. It should be noted that the number of the piezoelectric actuators 30 provided to the piezoelectric motor 10 is not limited to four, but can be in a range from one through three, or can also be not smaller than five. The piezoelectric actuators 30 are not required to be disposed at regular intervals.

The rotor 40 has the output section 41 described above, and a transmission section 45 disposed on the outer periphery of the output section 41 and coupled to the output section 41. In the present embodiment, the rotor 40 rotates around a rotational axis RX. The rotor 40 has the output section 41 as a hollow. It should be noted that it is possible for the rotor 40 to have the output section 41 as a solid body. A direction from the lower case 29 toward the lid part 23 along the rotational axis RX of the output section 41 of the rotor 40 is referred to as an axial direction AD, and a direction from the rotational axis RX toward the outside and perpendicular to the rotational axis RX of the output section 41 is referred to as a radial direction RD. Further, the rotational direction of the rotor 40 is referred to as a circumferential direction CD. These directions AD, RD, and CD are arbitrarily illustrated in each of the drawings.

The transmission section 45 receives a drive force from the tip part 33 of each of the piezoelectric actuators 30, and then transmits the drive force to the output section 41. The transmission section 45 has a first portion 46 and a second portion 47 sequentially coupled in a direction from the output section 41 toward the outside in the radial direction RD. In the present embodiment, the first portion 46 has a shape having a portion shaped like a circular ring centering on the rotational axis RX and a portion shaped like a circular cylinder centering on the rotational axis RX combined with each other. The portion shaped like a circular ring of the first portion 46 is coupled to an outer circumferential side surface of the output section 41. The portion shaped like a circular ring of the first portion 46 extends from an end part on the lid part 23 side in the outer circumferential side surface of the output section 41 toward the outside in the radial direction RD. The portion shaped like a circular cylinder of the first portion 46 extends from the portion shaped like a circular ring of the first portion 46 toward the bottom surface part 21 of the case 20. The outside diameter of the portion shaped like a circular cylinder of the first portion 46 is the same as the outside diameter of the portion shaped like a circular ring of the first portion 46. The first portion 46 has a region R1 overlapping the bearing 50 in the axial direction AD, and a region R2 overlapping the bearing 50 in the radial direction RD. The second portion 47 is coupled to the outer circumferential side surface of the portion shaped like a circular cylinder of the first portion 46. The second portion 47 extends from the end part on the bottom surface part 21 side in the outer circumferential side surface of the first portion 46 toward the outside in the radial direction RD. The second portion 47 has a circular ring shape centering on the rotational axis RX. The second portion 47 does not overlap the first portion 46 in the axial direction AD. Therefore, in the present embodiment, the distance between the second portion 47 and the output section 41 is longer than the distance between the first portion 46 and the output section 41. It should be noted that overlapping in the axial direction AD means overlapping when viewed along the axial direction AD. Overlapping in the radial direction RD means overlapping when viewed along the radial direction RD. For example, the region R1 of the first portion 46 means a region of the first portion 46 overlapping the bearing 50 when viewing the first portion 46 and the bearing 50 along the axial direction AD.

In the present embodiment, the output section 41 and the first portion 46 are formed integrally with each other. In FIG. 1 and FIG. 2, a boundary between the output section 41 and the first portion 46 is represented by a dashed-two dotted line. It should be noted that it is also possible for the output section 41 and the first portion 46 to be formed as separated bodies. In this case, the output section 41 and the first portion 46 formed as the separated bodies are fixed to each other with screws, welding, an adhesive, or the like. The boundary between the output section 41 and the first portion 46 shown in FIG. 1 and FIG. 2 is drawn for the sake of convenience of explanation, and can arbitrarily be set in view of the function of each of the constituents.

The first portion 46 and the second portion 47 are formed as separated bodies. In the present embodiment, the first portion 46 and the second portion 47 are fixed to each other with screws. It should be noted that it is possible for the first portion 46 and the second portion 47 to be fixed to each other by providing the first portion 46 with external screw parts, providing the second portion 47 with internal screw ports, and fitting the external screws and the internal screws with each other. It is also possible for the first portion 46 and the second portion 47 to be coupled to each other with welding, bonding, or the like.

The first portion 46 and the second portion 47 are formed of different materials from each other. The Young's modulus of the second portion 47 is higher than the Young's modulus of the first portion 46. The mass per unit volume of the second portion 47 is higher than the mass per unit volume of the first portion 46. In the present embodiment, the material of the first portion 46 is an aluminum alloy, and the material of the second portion 47 is stainless steel. It should be noted that it is also possible for the material of the first portion 46 to be an aluminum alloy, and for the material of the second portion 47 to be a titanium alloy. It is also possible for the material of the first portion 46 to be a resin material, and for the material of the second portion 47 to be stainless steel. It is also possible for the material of the first portion 46 to be a resin material, and for the material of the second portion 47 to be a titanium alloy. As the resin material, there can be used, for example, engineering plastic such as polyacetal (POM), polyamide (PA), polycarbonate (PC), modified polyphenylene ether (m-PPE), or polybutylene terephthalate (PBT), or super engineering plastic such as amorphous polyarylate (PAR), polysulfone (PSF), polyether sulfone (PSE), polyphenylene sulfide (PPS), polyether ether ketone (PEEK), polyimide (PI), polyetherimide (PEI), polytetrafluoroethylene (PTFE). It should be noted that in the present embodiment, the material of the output section 41 is the same as the material of the first portion 46.

In the present embodiment, the transmission section 45 has a high-hardness part 48. The high-hardness part 48 is disposed between a tip part 33 of each of the piezoelectric actuators 30 and the second portion 47 in the axial direction AD. The high-hardness part 48 has a circular ring shape centering on the rotational axis RX. The outside diameter of the high-hardness part 48 is the same as the outside diameter of the second portion 47. The inside diameter of the high-hardness part 48 is larger than the outside diameter of the first portion 46. In the axial direction AD, the entire area of the high harness part 48 overlaps the second portion 47. In other words, the high-hardness part 48 does not have a portion protruding from the second portion 47 along the radial direction RD. A part of the second portion 47 is disposed between the first portion 46 and the high-hardness part 48 in the radial direction RD, and has contact with the first portion 46 and the high-hardness part 48. The high-hardness part 48, is bonded to a surface of the second portion 47 crossing the axial direction AD, and a surface of the second portion 47 crossing the radial direction RD with an adhesive having an insulation property. In the high-hardness part 48, there is disposed a contacted surface 49 with which the tip part 33 of each of the piezoelectric actuators 30 makes contact. The contacted surface 49 overlaps the second portion 47 in the axial direction AD. The hardness of the high-hardness part 48 is higher than the hardness of the second portion 47. The hardness of the high-hardness part 48 and the hardness of the second portion 47 each mean the hardness measured in the Vickers hardness test (JIS Z 2244). In the Vickers hardness test, a test piece obtained from the piezoelectric motor 10 in the assembled state is used to measure the hardness of the high-hardness part 48 and the hardness of the second portion 47. In the present embodiment, the high-hardness part 48 is formed of a ceramic material. More specifically, the high-hardness part 48 is formed of alumina (aluminum oxide). It should be noted that as the ceramic material forming the high-hardness part 48, there can be used, for example, zirconia or barium titanate besides alumina. It is possible for the high-hardness part 48 to be formed of a metal material. As the metal material forming the high-hardness part 48, there can be used, for example, cemented carbide, high-speed steel, and alloy tool steel. It is possible for the high-hardness part 48 to be fixed to the second portion 47 with screws, diffusion bonding, or the like. It is also possible for the second portion 47 to be provided with a groove, and it is also possible for the high-hardness part 48 to fit in the groove.

The bearing 50 is disposed between the output section 41 of the rotor 40 and the protruding part 24 of the case 20. The bearing 50 rotatably supports the rotor 40 to the case 20. In the present embodiment, as the bearing 50, there is used a roller bearing having a circular ring shape centering on the rotational axis RX. The bearing 50 can be, for example, a ball bearing instead of the roller bearing. By the bearing 50 supporting the rotor 40, the rotor 40 can smoothly rotate around the rotational axis RX.

The outer race of the bearing 50 is clamped by a first support member 56 and the bottom surface part 21 of the case 20. The first support member 56 has a circular ring shape centering on the rotational axis RX. A cross-sectional surface of the first support member 56 perpendicular to the circumferential direction CD has an L-shape. In the present embodiment, screw parts are provided to each of the outer circumferential side surface of the first support member 56 and the inner circumferential side surface of the protruding part 24 of the case 20, and by making the screw parts fit in each other, the first support member 56 is fixed to the protruding part 24.

The inner race of the bearing 50 is clamped by a second support member 57 and the output section 41 of the rotor 40. The second support member 57 has a circular ring shape centering on the rotational axis RX. A cross-sectional surface of the second support member 57 perpendicular to the circumferential direction CD has an L-shape obtained by rotating the cross-sectional surface of the first support member 56 as much as 180 degrees. In the present embodiment, screw parts are provided to each of the outer circumferential side surface of the output section 41 of the rotor 40 and the inner circumferential side surface of the second support member 57, and by making the screw parts fit in each other, the second support member 57 is fixed to the rotor 40.

After the rotor 40 is rotatably coupled to the lower case 29 using the bearing 50, the first support member 56, and the second support member 57 as shown in FIG. 1, the fixation member 36 to which the piezoelectric actuators 30 are coupled in advance is coupled to the lower case 29 as shown in FIG. 2.

Figure 3:
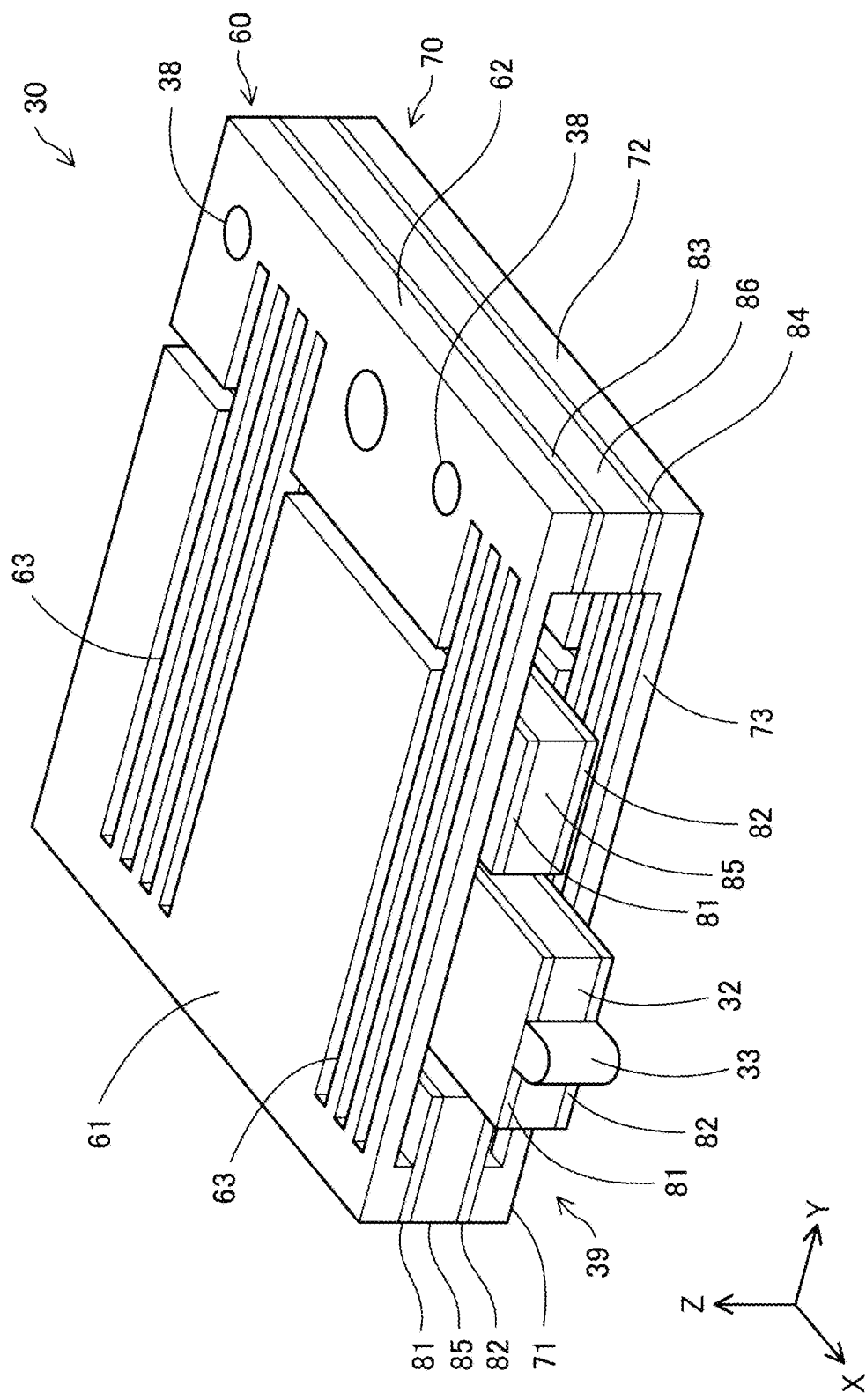
FIG. 3 is a perspective view showing a configuration of a piezoelectric actuator in the first embodiment.

FIG. 3 is a perspective view showing a configuration of each of the piezoelectric actuators 30. In FIG. 3, there are shown the arrows along X, Y, and Z directions perpendicular to each other, respectively. The X direction is a direction parallel to the axial direction AD shown in FIG. 1 and FIG. 2, and the Z direction is a direction parallel to the radial direction RD shown in FIG. 1 and FIG. 2. These directions X, Y, and Z are arbitrarily illustrated in each of the drawings. The piezoelectric actuator 30 is provided with a main body part 39 having the piezoelectric elements 32, the tip part 33 coupled to the main body part 39, a first parallel spring part 60 for biasing the main body part 39 toward the rotor 40, and a second parallel spring part 70 for biasing the main body part 39 toward the rotor 40 together with the first parallel spring part 60.

The main body part 39 is disposed between the first parallel spring part 60 and the second parallel spring part 70. The main body part 39 is constituted by the piezoelectric elements 32, a first vibrating plate 81, a second vibrating plate 82, and a first interlayer member 85. The piezoelectric elements 32 are disposed between the first vibrating plate 81 and the second vibrating plate 82. The first interlayer member 85 is disposed so as to fill a gap between the first vibrating plate 81 and the second vibrating plate 82.

The piezoelectric elements 32 are each formed of a piezoelectric body provided with electrodes disposed on both surfaces. In the present embodiment, the piezoelectric body is formed of lead zirconate titanate. The piezoelectric body can be formed of, for example, barium titanate or quartz crystal instead of lead zirconate titanate. The electrodes are coupled to a power supply via a switching element with interconnections not shown.

The first vibrating plate 81 and the second vibrating plate 82 have the same shape. The first vibrating plate 81 and the second vibrating plate 82 are formed of silicon. With an adhesive having an insulation property, the piezoelectric elements 32 and the first vibrating plate 81 are bonded to each other, and the piezoelectric elements 32 and the second vibrating plate 82 are bonded to each other. The first interlayer member 85 is formed of silicon. With an adhesive having an insulation property, the first interlayer member 85 and the first vibrating plate 81 are bonded to each other, and the first interlayer member 85 and the second vibrating plate 82 are bonded to each other.

The tip part 33 is bonded to the main body part 39 with an adhesive having an insulation property. The tip part 33 is preferably formed of a material superior in abrasion resistance. In the present embodiment, the tip part 33 is formed of alumina.

The first parallel spring part 60 has a first non-spring part 61, a second non-spring part 62, and a plurality of first plate spring parts 63 for coupling the first non-spring part 61 and the second non-spring part 62 to each other. In the present embodiment, the first non-spring part 61 and the second non-spring part 62 are coupled to each other with the six first plane spring parts 63. The first non-spring part 61 and the second non-spring part 62 are each a part hard to deform along the X direction in the first parallel spring part 60. The first plate spring parts 63 are each a part easy to deform along the X direction in the first parallel spring part 60. The first plate spring parts 63 extend in parallel to each other toward the Y direction. The first plate spring parts 63 are disposed so as to be opposed to the main body part 39 in the Z direction.

The second parallel spring part 70 has a third non-spring part 71, a fourth non-spring part 72, and a plurality of second plate spring parts 73 for coupling the third non-spring part 71 and the fourth non-spring part 72 to each other. The third non-spring part 71 and the fourth non-spring part 72 are each a part hard to deform along the X direction in the second parallel spring part 70. The second plate spring parts 73 are each a part easy to deform along the X direction in the second parallel spring part 70. The second plate spring parts 73 extend in parallel to each other toward the Y direction. The second plate spring parts 73 are disposed so as to be opposed to the main body part 39 in the Z direction. In the present embodiment, the second parallel spring part 70 has a symmetrical shape with the first parallel spring part 60 across the main body part 39.

The first parallel spring part 60 and the second parallel spring part 70 are each formed of silicon. The first non-spring part 61, the second non-spring part 62, and the first plate spring parts 63 in the first parallel spring part 60 can be formed using dry etching on silicon shaped like a plate. The third non-spring part 71, the fourth non-spring part 72, and the second plate spring parts 73 in the second parallel spring part 70 can be formed using dry etching on silicon shaped like a plate.

Between the second non-spring part 62 of the first parallel spring part 60 and the fourth non-spring part 72 of the second parallel spring part 70, there are disposed a third vibrating plate 83, a second interlayer member 86, and a fourth vibrating plate 84 in this order from the second non-spring part 62 toward the fourth non-spring part 72. The third vibrating plate 83 and the fourth vibrating plate 84 have the same shape. The third vibrating plate 83 and the fourth vibrating plate 84 are formed of silicon. The thickness along the Z direction of the third vibrating plate 83 is the same as the thickness along the Z direction of the first vibrating plate 81. The thickness along the Z direction of the fourth vibrating plate 84 is the same as the thickness along the Z direction of the second vibrating plate 82. The second interlayer member 86 is formed of silicon. The thickness along the Z direction of the second interlayer member 86 is the same as the thickness along the Z direction of the first interlayer member 85.

The second non-spring part 62 and the fourth non-spring part 72 are each provided with two attaching holes 38 to which screws for fixing the piezoelectric actuator 30 to the fixation member 36 are inserted. The attaching holes 38 are disposed so as to penetrate the first parallel spring part 60, the third vibrating plate 83, the second interlayer member 86, the fourth vibrating plate 84, and the second parallel spring part 70.

Figure 4:
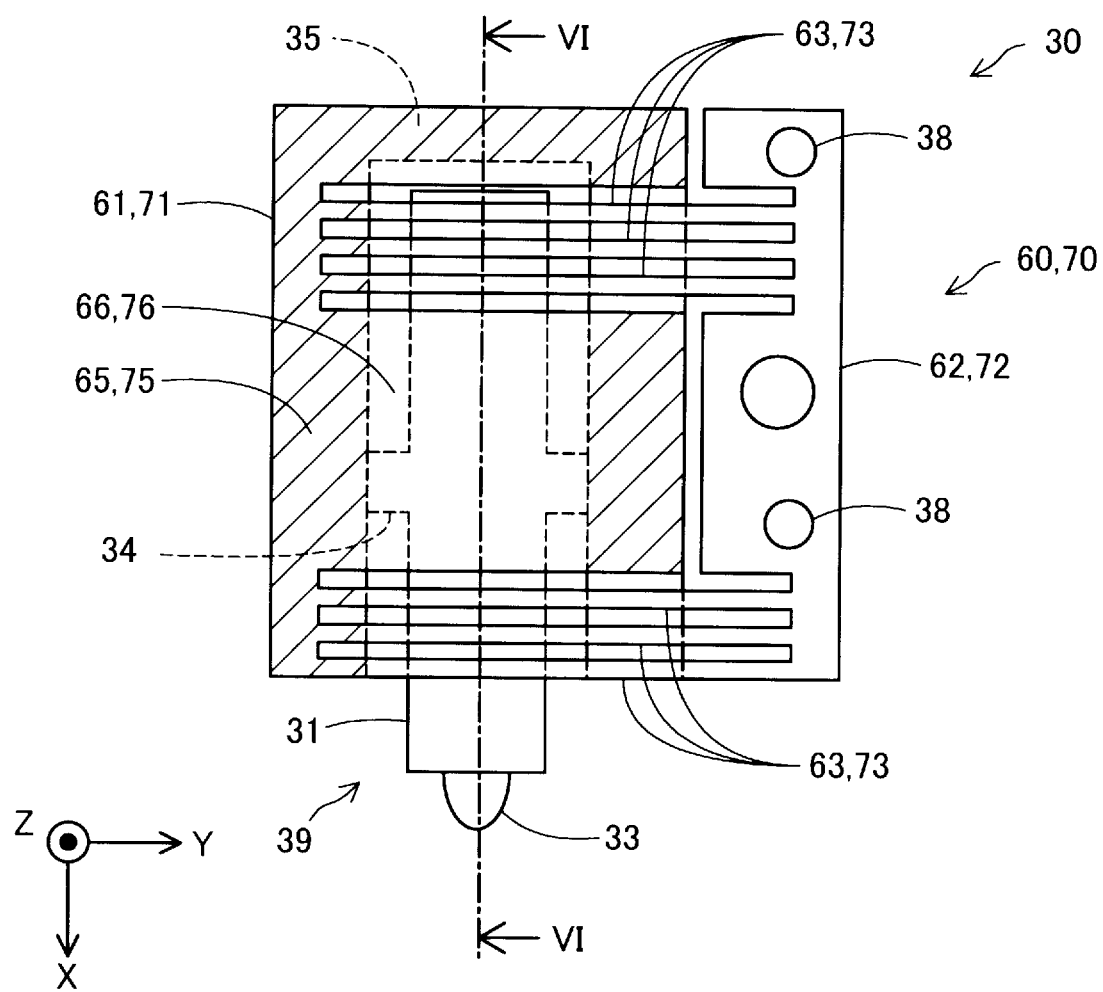
FIG. 4 is a plan view showing the configuration of the piezoelectric actuator in the first embodiment.

FIG. 4 is a plan view showing a configuration of each of the piezoelectric actuators 30. The main body part 39 has a vibrating part 31, a support part 34, and an arm part 35. The vibrating part 31 is a portion having the piezoelectric elements 32. The shape of the vibrating part 31 viewed from the first parallel spring part 60 toward the second parallel spring part 70 is a rectangular shape having a longitudinal direction along the X direction. At the center of one of the short sides of the vibrating part 31, there is coupled the tip part 33. The arm part 35 is a portion opposed to the other of the short sides of the vibrating part 31 and both long sides of the vibrating part 31. The support part 34 is a portion for coupling the centers of both of the long sides of the vibrating part 31 and the arm part 35 to each other.

The first non-spring part 61 of the first parallel spring part 60 has a first thick wall part 65 and a first thin wall part 66. The thickness along the Z direction of the first thin wall part 66 is smaller than the thickness along the Z direction of the first thick wall part 65. The first thick wall part 65 is disposed in an area opposed to the arm part 35 in the first non-spring part 61. In FIG. 4, there is provided hatching in the area where the first thick wall part 65 is disposed. The first thin wall part 66 is disposed in an area opposed to the vibrating part 31 and the support part 34 in the first non-spring part 61. The first thick wall part 65 is bonded to the arm part 35 with an adhesive having an insulation property. The first thin wall part 66 has a predetermined distance from the vibrating part 31 and the support part 34.

The second non-spring part 71 of the second parallel spring part 70 has a second thick wall part 75 and a second thin wall part 76. The thickness along the Z direction of the second thin wall part 76 is smaller than the thickness along the Z direction of the second thick wall part 75. The second thick wall part 75 is disposed in an area opposed to the arm part 35 in the third non-spring part 71. In FIG. 4, there is provided hatching in the area where the second thick wall part 75 is disposed. The second thin wall part 76 is disposed in an area opposed to the vibrating part 31 and the support part 34 in the third non-spring part 71. The second thick wall part 75 is bonded to the arm part 35 with an adhesive having an insulation property. The second thin wall part 76 has a predetermined distance from the vibrating part 31 and the support part 34.

Figure 5:
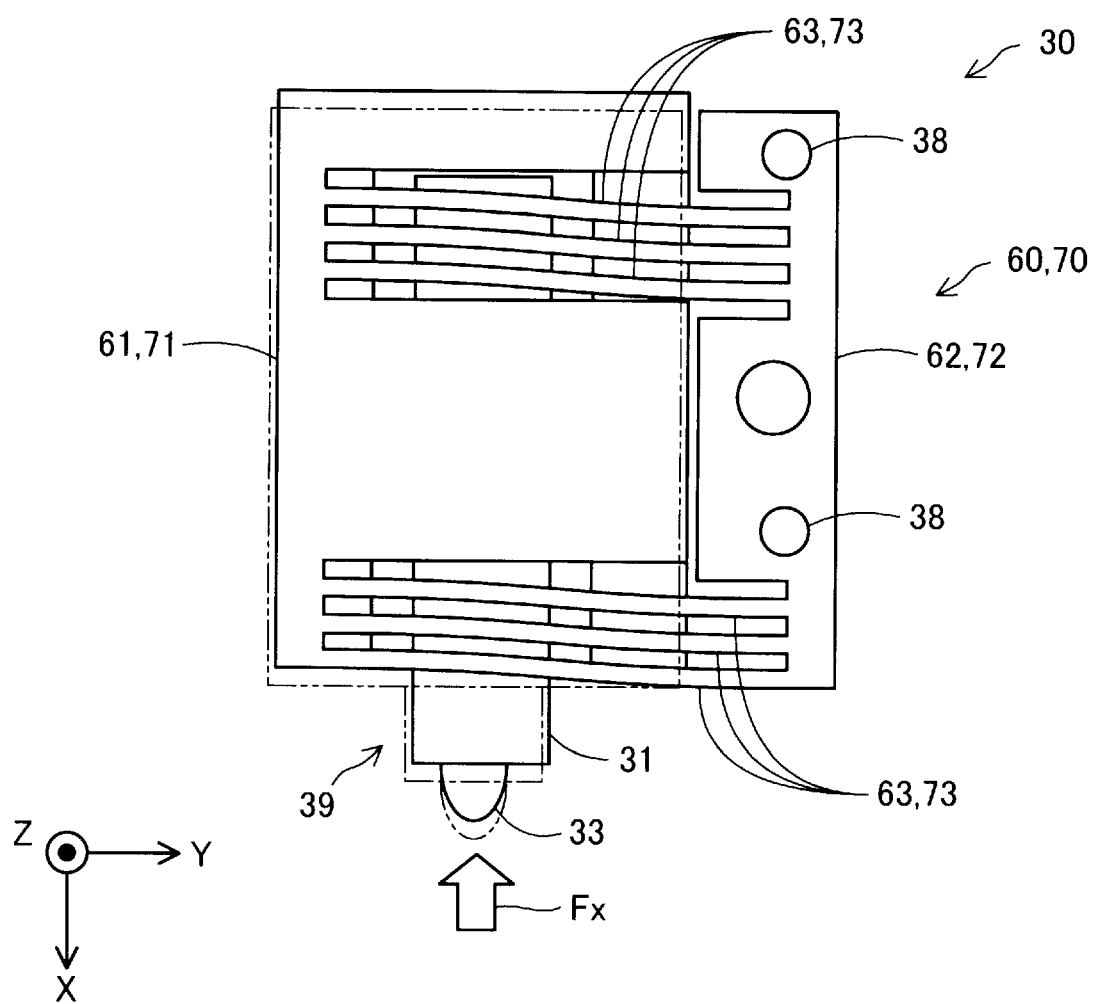
FIG. 5 is an explanatory diagram showing how a first parallel spring part and a second parallel spring part deform.

FIG. 5 is an explanatory diagram showing how the first parallel spring part 60 and the second parallel spring part 70 deform. The first parallel spring part 60 functions as a parallel spring mechanism with respect to a load along the X direction. The second parallel spring part 70 functions as a parallel spring mechanism with respect to the load along the X direction similarly to the first parallel spring part 60. For example, as shown in FIG. 5, when the load Fx is applied to the tip part 33 toward the −X direction, the first non-spring part 61 and the third non-spring part 71 are pushed toward the −X direction via the main body part 39. By the first non-spring part 61 and the third non-spring part 71 being pushed toward the −X direction, the first plate spring parts 63 warp toward the −X direction while keeping the parallel state, and the second plate spring parts 73 warp toward the −X direction while keeping the parallel state. The first non-spring part 61 does not rotate with respect to the second non-spring part 62, but is translated toward the −X direction in accordance with the amount of the deflection toward the −X direction of the first plate spring parts 63, and at the same time, translated toward the +Y direction in accordance with the shift amount toward the +Y direction of a coupling part between the first plate spring parts 63 and the first non-spring part 61 due to the deflection of the first plate spring parts 63. The third non-spring part 71 does not rotate with respect to the fourth non-spring part 72, but is translated toward the −X direction in accordance with the amount of the deflection toward the −X direction of the second plate spring parts 73, and at the same time, translated toward the +Y direction in accordance with the shift amount toward the +Y direction of a coupling part between the second plate spring parts 73 and the third non-spring part 71 due to the deflection of the second plate spring parts 73. It should be noted that in FIG. 5, the positions of the first parallel spring part 60 and the second parallel spring part 70 which have not yet moved are represented by the dashed-two dotted lines. The first non-spring part 61, the second non-spring part 62, the third non-spring part 71, and the fourth non-spring part 72 hardly deform. The second non-spring part 62 and the fourth non-spring part 72 are fixed to the fixation member 36, and therefore, do not move with respect to the fixation member 36.

Figure 6:
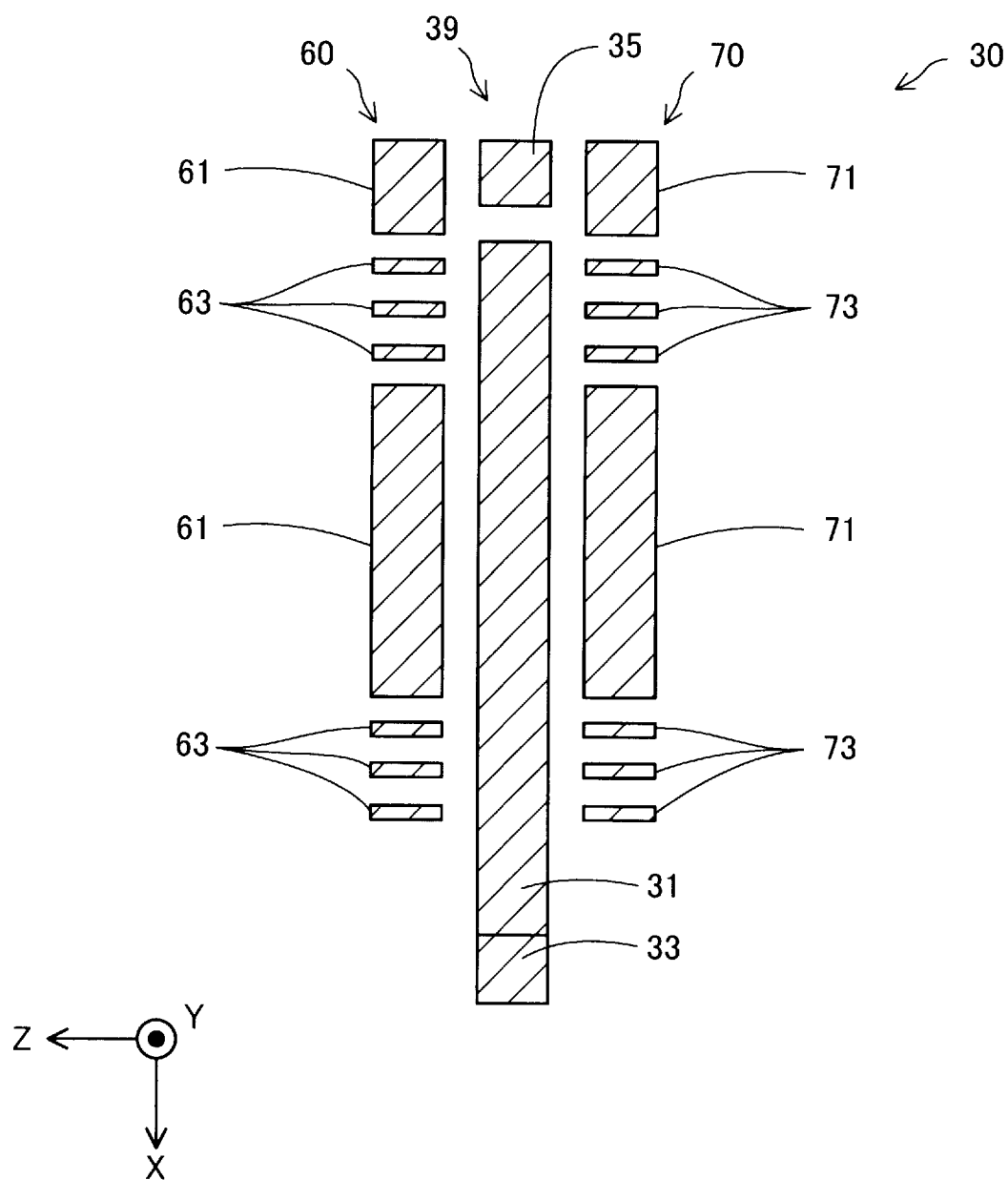
FIG. 6 is a cross-sectional view along the VI-VI line of the piezoelectric actuator in the first embodiment.

FIG. 6 is a cross-sectional view along the VI-VI line of the piezoelectric actuator 30 in FIG. 4. In the present embodiment, the cross-sectional shape of each of the first plate spring parts 63 and the cross-sectional shape of each of the second plate spring parts 73 are each a rectangular shape.

Figure 7:
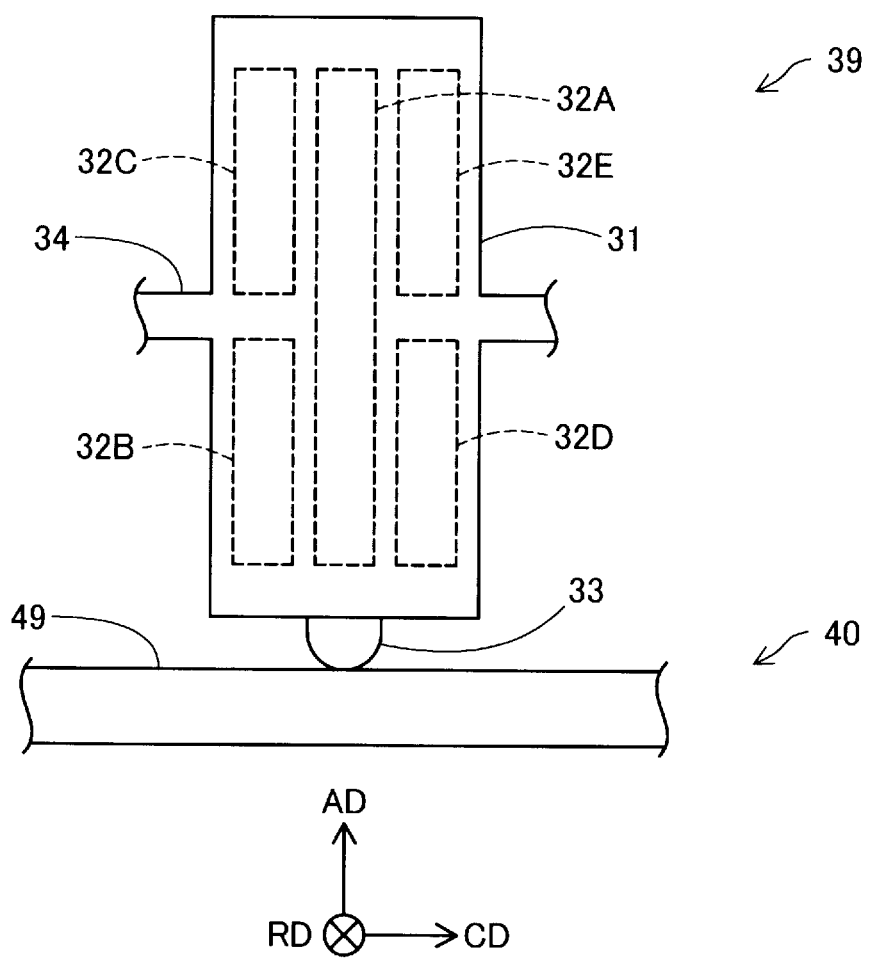
FIG. 7 is an explanatory diagram showing a configuration of a vibrating part in the first embodiment.

FIG. 7 is an explanatory diagram showing a configuration of the vibrating part 31. In the present embodiment, the vibrating part 31 has a first piezoelectric element 32A, a second piezoelectric element 32B, a third piezoelectric element 32C, a fourth piezoelectric element 32D, and a fifth piezoelectric element 32E. Each of the piezoelectric elements 32A through 32E is disposed along the longitudinal direction of the vibrating part 31. In FIG. 7, the first piezoelectric element 32A is disposed at the center of the vibrating part 31. The second piezoelectric element 32B and the third piezoelectric element 32C are disposed on the left side of the first piezoelectric element 32A. The second piezoelectric element 32B is disposed on the lower side of the support part 34. The third piezoelectric element 32C is disposed on the upper side of the support part 34. The fourth piezoelectric element 32D and the fifth piezoelectric element 32E are disposed on the right side of the first piezoelectric element 32A. The fourth piezoelectric element 32D is disposed on the lower side of the support part 34. The fifth piezoelectric element 32E is disposed on the upper side of the support part 34.

Figure 8:
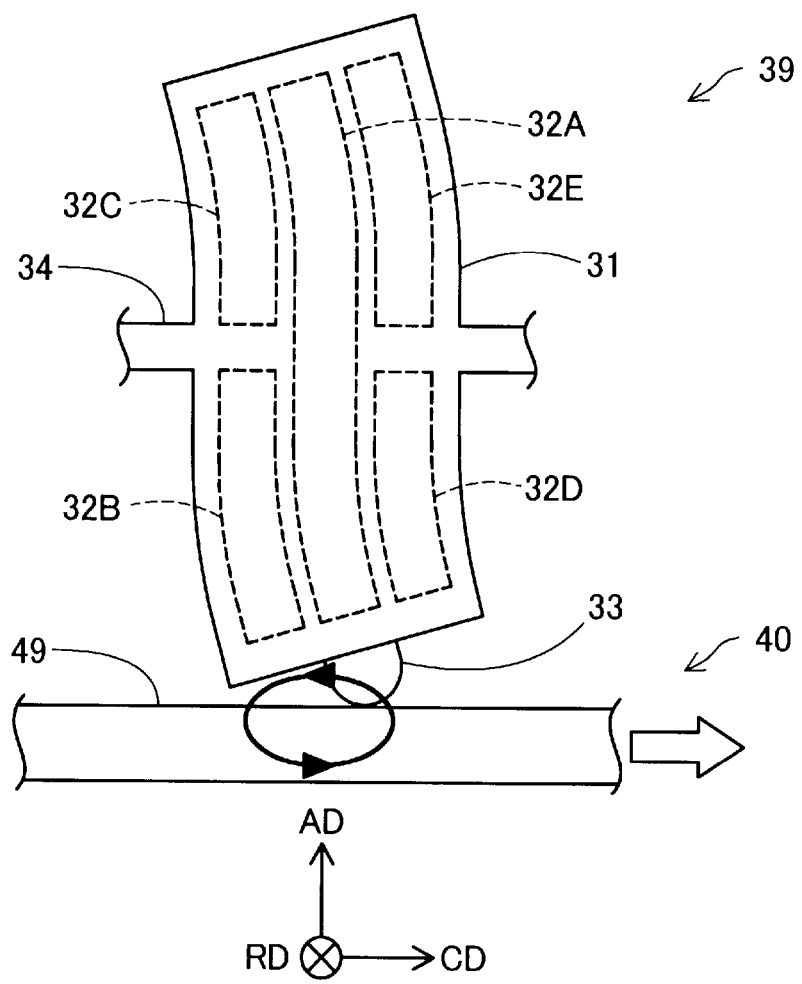
FIG. 8 is an explanatory diagram showing an operation of the vibrating part in the first embodiment.

FIG. 8 is an explanatory diagram showing an operation of the vibrating part 31. It is possible to make the tip part 33 perform an elliptical motion by making a phase of an AC current supplied to the second piezoelectric element 32B and the fifth piezoelectric element 32E and a phase of an AC current supplied to the third piezoelectric element 32C and the fourth piezoelectric element 32D differ as much as 180 degrees from each other, and making a phase of an AC current supplied to the first piezoelectric element 32A and the phase of the AC current supplied to the second piezoelectric element 32B and the fifth piezoelectric element 32E differ from each other to thereby two-dimensionally deform the vibrating part 31. On this occasion, the vibrating part 31 deforms with the coupling portion with the support part 34 as a node. By the tip part 33 repeating the elliptical motion, the tip part 33 and the contacted surface 49 of the rotor 40 repeatedly make contact with each other. When the tip part 33 and the contacted surface 49 make contact with each other, the tip part 33 transmits the drive force along the circumferential direction CD to the rotor 40. Therefore, during a period in which the tip part 33 repeats the elliptical motion, the rotor 40 rotates around the rotational axis RX. In the present embodiment, since the tip part 33 is biased toward the contacted surface 49 when the tip part 33 and the contacted surface 49 make contact with each other, it is possible for the tip part 33 to efficiently transmit the drive force along the circumferential direction CD to the rotor 40. It should be noted that it is possible to rotate the rotor 40 in an opposite direction by making a 180-degree turn of the AC current to be supplied to each of the piezoelectric elements 32A through 32E described above.

According to the piezoelectric motor 10 in the present embodiment described above, by providing the first portion 46 low in mass per unit volume to the rotor 40, it is possible to reduce the weight of the rotor 40, and by providing the second portion 47 high in Young's modulus and mass per unit volume to the rotor 40, it is possible to keep the rigidity of the rotor 40, and therefore, it is possible to suppress the vibration of the rotor 40. Therefore, it is possible to achieve both of the reduction in weight of the rotor 40, and the efficient transmission of the drive force from the piezoelectric actuators 30 to the rotor 40. In particular, in the present embodiment, since the output section 41 and the first portion 46 are formed of the same material integrally with each other, it is possible to efficiently reduce the weight of the rotor 40.

Further, in the present embodiment, the second portion 47 high in mass per unit volume is disposed at a position far from the output section 41 in the radial direction RD. Therefore, it is possible to efficiently suppress the vibration of the rotor 40.

Further, in the present embodiment, the tip part 33 of each of the piezoelectric actuators 30 makes contact with the contacted surface 49 provided to the high-hardness part 48 of the rotor 40. Therefore, the abrasion of the rotor 40 due to the contact with the tip part 33 can be suppressed.

Further, in the present embodiment, since the high-hardness part 48 is disposed between the tip part 33 and the second portion 47 in the axial direction AD, it is possible to reduce the piezoelectric motor 10 in size in the radial direction RD.

Further, in the present embodiment, the high-hardness part 48 is not directly coupled to the first portion 46, but is coupled to the first portion 46 via the second portion 47. Therefore, it is possible to prevent the drive force from the piezoelectric actuators 30 from directly reaching the first portion 46 from the high-hardness part 48. Therefore, since it is possible to prevent the first portion 46 from vibrating, it is possible to more efficiently transmit the drive force from the piezoelectric actuators 30 to the output section 41 of the rotor 40.

Further, in the present embodiment, since the contacted surface 49 is disposed between both ends of the rotor 40 in the axial direction AD, it is possible to arrange the piezoelectric actuators 30 and the rotor 40 so as to overlap each other in the radial direction RD. Therefore, it is possible to reduce the piezoelectric motor 10 in size in the axial direction AD.

B. Second Embodiment

Figure 9:
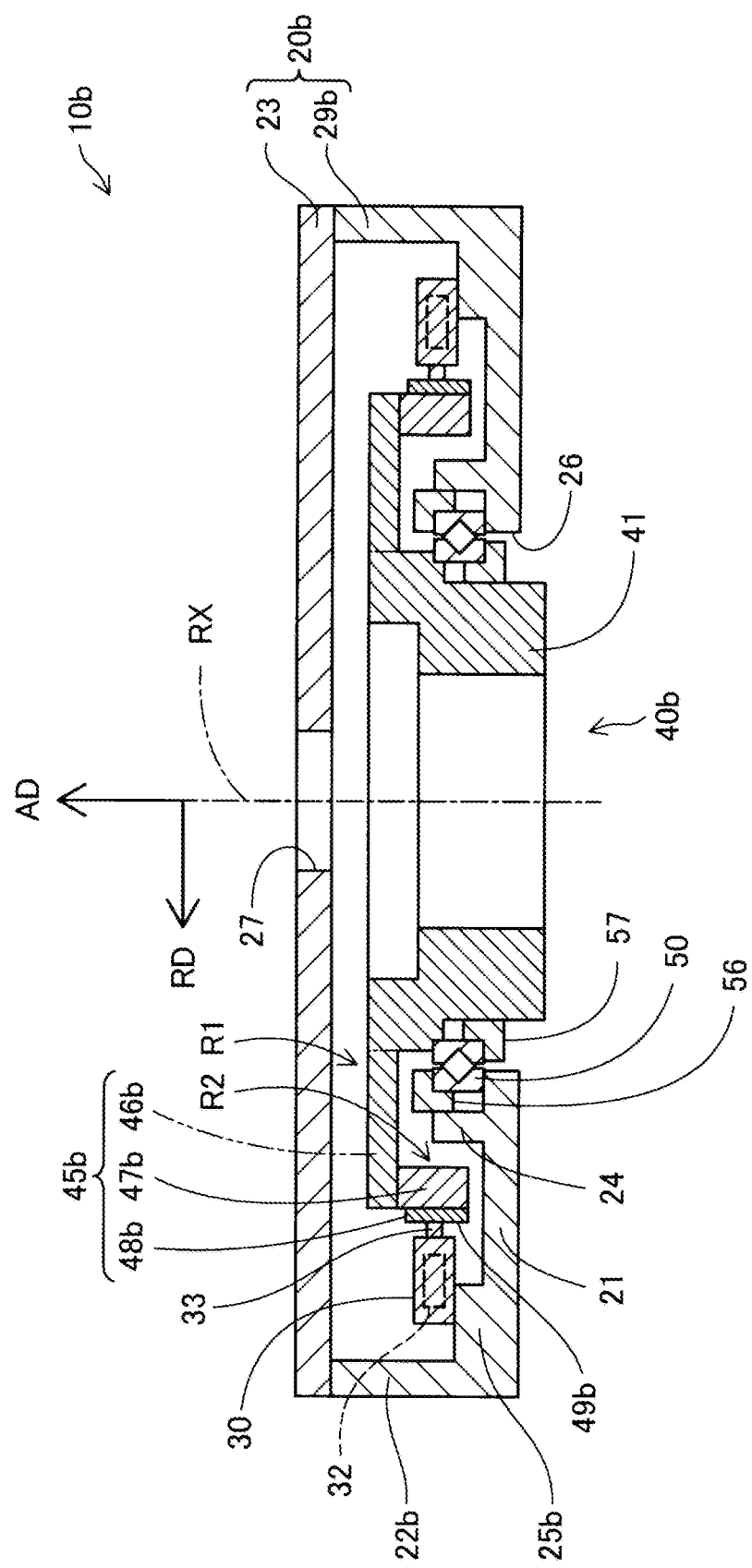
FIG. 9 is a first explanatory diagram showing a schematic configuration of a piezoelectric motor according to a second embodiment.

FIG. 9 is a cross-sectional view showing a configuration of a piezoelectric motor 10b in a second embodiment. In the piezoelectric motor 10b in the second embodiment, the configuration of a transmission section 45b of a rotor 40b, and an arrangement of the piezoelectric actuators 30 are different from those in the first embodiment. The other configurations are the same as those in the first embodiment shown in FIG. 1 through FIG. 8 unless particularly described.

In the present embodiment, the first portion 46*b* of the transmission section 45*b* extends from the output section 41 toward the outside in the radial direction RD. The first portion 46*b* has a circular ring shape centering on the rotational axis RX. The second portion 47*b* of the transmission section 45*b* extends from the first portion 46*b* toward the bottom surface part 21 of the case 20. The second portion 47*b* has a circular cylindrical shape centering on the rotational axis RX. The outside diameter of the second portion 47*b* is the same as the outside diameter of the first portion 46*b*. On the outer circumferential side surface of the second portion 47*b*, there is disposed a high-hardness part 48*b*. The high-hardness part 48*b* has a circular cylindrical shape centering on the rotational axis RX. On the outer circumferential side surface of the high-hardness part 48*b*, there is disposed a contacted surface 49*b* with which the tip part 33 of each of the piezoelectric actuators 30 makes contact. The high-hardness part 48*b* overlaps the second portion 47*b* in the radial direction RD, and is bonded to the second portion 47*b*. It should be noted that it is possible for the high-hardness part 48*b* to overlap the first portion 46*b* and the second portion 47*b* in the radial direction RD to be bonded to the first portion 46*b* and the second portion 47*b*.

In the present embodiment, the piezoelectric actuators 30 are disposed inside the case 20*b* so that the direction from the vibrating part 31 toward the tip part 33 is parallel to the radial direction RD, and the direction from the first parallel spring part 60 toward the second parallel spring part 70 is parallel to the axial direction AD. In FIG. 9, although the illustration of the fixation member 36 is omitted, the piezoelectric actuators 30 are fixed to a step part 25*b* of a lower case 29*b* via the fixation member 36. It should be noted that in the present embodiment, the height of the step part 25*b* along the axial direction AD is lower than the height of the step part 25 in the first embodiment. The height of a side surface part 22*b* along the axial direction AD is lower than the height of the side surface part 22 in the first embodiment.

According to the piezoelectric motor 10*b* in the present embodiment described hereinabove, it is possible to further reduce the piezoelectric motor 10*b* in size in the axial direction AD compared to the piezoelectric motor 10 in the first embodiment.

C. Third Embodiment

Figure 10:
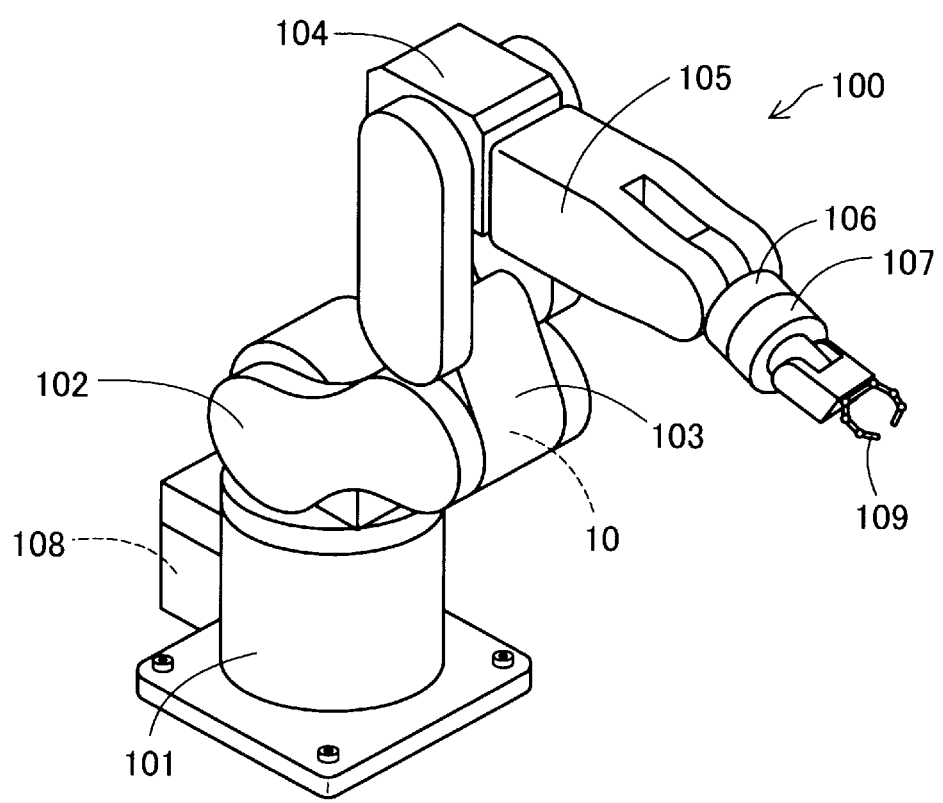
FIG. 10 is an explanatory diagram showing a schematic configuration of a robot according to a third embodiment.

FIG. 10 is a perspective view showing a schematic configuration of a robot 100 according to a third embodiment. The robot 100 according to the present embodiment is capable of performing operations such as feed, removal, transmission, and assembling of precision mechanical equipment or a component constituting the precision mechanical equipment. The robot 100 is a six-axis robot, and is provided with a base 101 to be fixed to the floor or the ceiling, a first arm 102 rotatably coupled to the base 101, a second arm 103 rotatably coupled to the first arm 102, a third arm 104 rotatably coupled to the second arm 103, a fourth arm 105 rotatably coupled to the third arm 104, a fifth arm 106 rotatably coupled to the fourth arm 105, a sixth arm 107 rotatably coupled to the fifth arm 106, and a robot control section 108 for controlling drive of each of the arms 102, 103, 104, 105, 106, and 107. The sixth arm 107 is provided with a hand coupling section, and to the hand coupling section, there is attached an end effector 109 corresponding to an operation to be performed by the robot 100. The piezoelectric motor 10 described in the first embodiment is installed in all or some of the joint sections, and due to the drive of the piezoelectric motor 10, each of the arms 102, 103, 104, 105, 106, and 107 rotates. The drive of each of the piezoelectric motors 10 is controlled by the robot control section 108.

The robot control section 108 is formed of a computer provided with at least one processor, a main storage device, and an input/output interface for performing input/output of a signal with the outside. In the present embodiment, the robot control section 108 controls the operation of the robot 100 by the processor executing a program or instructions retrieved on the main storage device. It should be noted that it is also possible for the robot control section 108 to be formed of a combination of a plurality of circuits instead of the computer.

According to the robot 100 in the present embodiment described hereinabove, since the piezoelectric motor 10 described in the first embodiment is used in the joint part, it is possible to efficiently supply the drive force for driving each of the arms 102, 103, 104, 105, 106, and 107 with the piezoelectric motor 10 light in weight. It should be noted that it is possible for the robot 100 to be provided with the piezoelectric motor 10*b* described in the second embodiment.

D. Fourth Embodiment

Figure 11:
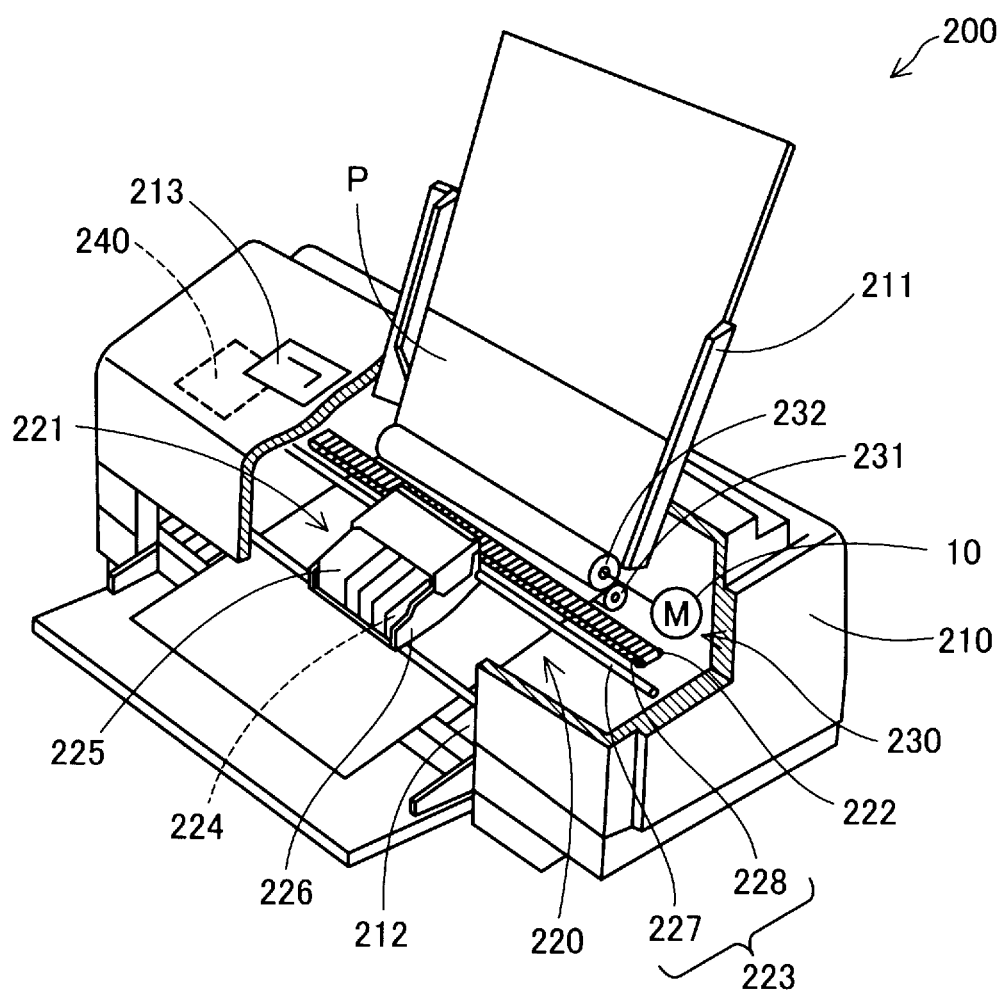
FIG. 11 is an explanatory diagram showing a schematic configuration of a printer according to a fourth embodiment.

FIG. 11 is an explanatory diagram showing a printer 200. The printer 200 in the present embodiment is provided with a device main body 210, a printing mechanism 220, a paper-feed mechanism 230, and a control section 240, wherein the printing mechanism 220, the paper-feed mechanism 230, and the control section 240 are disposed inside the device main body 210.

The device main body 210 is provided with a tray 211 for installing recording sheets P, a paper ejection port 212 for ejecting the recording sheets P, and an operation panel 213 such as a liquid crystal display.

The printing mechanism 220 is provided with a head unit 221, a carriage motor 222, and a reciprocation mechanism 223 for reciprocating the head unit 221 due to the drive force of the carriage motor 222.

The head unit 221 has a head 224 as an inkjet recording head, an ink cartridge 225 for supplying the head 224 with ink, and a carriage 226 on which the head 224 and the ink cartridge 225 are mounted.

The reciprocation mechanism 223 has a carriage guide shaft 227 supporting the carriage 226 so as to be able to reciprocate, and a timing belt 228 for moving the carriage 226 on the carriage guide shaft 227 due to the drive force of the carriage motor 222.

The paper-feed mechanism 230 has a driven roller 231 and a drive roller 232 having pressure contact with each other, and the piezoelectric motor 10 described in the first embodiment. The piezoelectric motor 10 is used as the paper-feed motor for driving the drive roller 232. It should be noted that it is possible to use the piezoelectric motor 10 as the carriage motor 222 described above.

The control section 240 controls the printing mechanism 220, the paper-feed mechanism 230, and so on based on the print data input from a host computer such as a personal computer.

In the printer 200, the paper-feed mechanism 230 intermittently feeds the recording sheet P to the vicinity of a lower part of the head unit 221 one by one. On this occasion, the head unit 221 reciprocates in a direction substantially perpendicular to the feeding direction of the recording sheet P to perform printing on the recording sheet P.

According to the printer 200 in the present embodiment described hereinabove, since the piezoelectric motor 10 described in the first embodiment is used as the paper-feed motor for driving the drive roller 232, it is possible to efficiently supply the drive force for driving the drive roller 232 with the piezoelectric motor 10 light in weight. It should be noted that it is possible for the printer 200 to be provided with the piezoelectric motor 10*b* described in the second embodiment.

E. Other Embodiments (E1) In the piezoelectric motors 10, 10*b* in the respective embodiments described above, the distance between the second portion 47, 47*b* of the transmission section 45, 45*b* and the output section 41 is longer than the distance between the first portion 46, 46*b* and the output section 41. In contrast, the distance between the second portion 47, 47*b* and the output section 41 can be equal to or shorter than the distance between the first portion 46, 46*b* and the output section 41. For example, the transmission section 45, 45*b* can be provided with a configuration in which a second portion high in Young's modulus and mass per unit volume, and a first portion low in Young's modulus and mass per unit volume are sequentially coupled in a direction from the output section 41 toward the outside in the radial direction RD. In this case, since a part of the rotor 40, 40*b* far from the output section 41 in the radial direction RD can be reduced in weight, it is possible to reduce the inertia moment of the rotor 40, 40*b*. Therefore, it is possible to improve the response in start and stop of the rotation of the rotor 40, 40*b*.

(E2) In the piezoelectric motors 10, 10*b* in the respective embodiments described above, the transmission section 45, 45*b* has the high-hardness part 48, 48*b*, and the tip part 33 of each of the piezoelectric actuators 30 makes contact with the contacted surface 49, 49*b* provided to the high-hardness part 48, 48*b*. In contrast, the transmission section 45, 45*b* is not required to have the high-hardness part 48, 48*b*. In this case, the contacted surface 49, 49*b* is provided to the second portion 47, 47*b*.

(E3) In the piezoelectric motor 10 in the first embodiment described above, the high-hardness part 48 is not directly coupled to the first portion 46, but is coupled to the first portion 46 via the second portion 47. In contrast, it is possible for the high-hardness part 48 to directly be coupled to both of the first portion and the second portion. For example, it is possible to dispose the high-hardness part 48 so that the inside diameter of the high-hardness part 48 and the outside diameter of the first portion 46 become the same. In this case, the high-hardness part 48 has contact with both of the first portion 46 and the second portion 47, and the high-hardness part 48 and the second portion 47 are fixed to each other with screws, bonding, diffusion bonding, or the like. It should be noted that the high-hardness part 48 and the first portion 46 can have contact with each other without being fixed to each other, or can be fixed to each other with screws, bonding, diffusion bonding, or the like so as to have contact with each other.

(E4) In the piezoelectric motors 10, 10*b* in the respective embodiments described above, the first portion 46, 46*b* has the region R1 overlapping the bearing 50 in the axial direction AD, and the region R2 overlapping the bearing 50 in the radial direction RD. In contrast, it is possible for the first portion 46, 46*b* to fail to have either one of the region R1 overlapping the bearing 50 in the axial direction AD, and the region R2 overlapping the bearing 50 in the radial direction RD.

(E5) In the piezoelectric motors 10, 10*b* in the respective embodiments described above, the second portion 47, 47*b* is coupled to the first portion 46, 46*b*. In contrast, it is possible to dispose a third portion different in Young's modulus and mass per unit volume from the first portion 46, 46*b* and the second portion 47, 47*b* between the first portion 46, 46*b* and the second portion 47, 47*b*, and couple the second portion 47, 47*b* to the first portion 46, 46*b* via the third portion. For example, it is possible for the first portion 46, 46*b*, the third portion, and the second portion 47, 47*b* to sequentially be coupled in a direction from the output section 41 toward the outside in the radial direction RD. The Young's modulus of the third portion can be higher than the Young's modulus of the first portion 46, 46*b*, and at the same time, lower than the Young's modulus of the second portion 47, 47*b*. The mass per unit volume of the third portion can be higher than the mass per unit volume of the first portion 46, 46*b*, and at the same time, lower than the mass per unit volume of the second portion 47, 47*b*. In this case, the weight and the rigidity of the rotor 40, 40*b* can more finely be adjusted.

(E6) In the piezoelectric motor 10 in the first embodiment described above, the high-hardness part 48 is disposed between the tip part 33 of each of the piezoelectric actuators 30 and the second portion 47 of the rotor 40. In contrast, the high-hardness part 48 is not required to be disposed between the tip part 33 of each of the piezoelectric actuators 30 and the second portion 47 of the rotor 40. For example, the high-hardness part 48 can have a circular cylindrical shape along the outer circumferential side surface of the first portion 46, the contacted surface 49 can be disposed on the outer circumferential side surface of the high-hardness part 48, and the piezoelectric actuators 30 can be disposed in the same direction as in the second embodiment shown in FIG. 9.

F. Other Aspects

The present disclosure is not limited to the embodiments described above, but can be implemented in a variety of aspects within the scope or the spirit of the present disclosure. For example, the present disclosure can also be implemented in the following aspects. The technical features in each of the embodiments described above corresponding to the technical features in each of the aspects described below can arbitrarily be replaced or combined in order to solve a part or the whole of the problem of the present disclosure, or to achieve some or all of the advantages of the present disclosure. Further, the technical feature can arbitrarily be eliminated unless described in the present specification as an essential element.

(1) According to a first aspect of the present disclosure, there is provided a piezoelectric drive device. The piezoelectric drive device includes a rotor which has an output section configured to output a rotational force and a transmission section disposed on an outer periphery of the output section, and rotates around a rotational axis, and a vibrating part which has a piezoelectric element, and rotates the rotor due to a deformation of the piezoelectric element. The transmission section has a first portion and a second portion which are different from each other in position in a radial direction from the output section toward the transmission section, the first portion is coupled to the output section, the second portion is higher in Young's modulus than the first portion, the second portion is higher in mass per unit volume than the first portion, and the vibrating part makes contact with the transmission section at a position overlapping the second portion in a plan view from an axial direction of the rotational axis.

According to the piezoelectric drive device of this aspect, by providing the first portion, it is possible to reduce the weight of the rotor, and at the same time, by providing the second portion, it is possible to ensure the rigidity of the rotor, and therefore, the vibration of the rotor can be suppressed. Therefore, it is possible to achieve both of the reduction in weight of the rotor, and the efficient transmission of the drive force from the vibrating part to the output section of the rotor.

(2) In the piezoelectric drive device according to the above aspect, a distance along the radial direction between the second portion and the output section may be longer than a distance along the radial direction between the first portion and the output section.

According to the piezoelectric drive device of this aspect, by disposing the second portion at a position far from the output section, the vibration of the rotor can efficiently be suppressed.

(3) In the piezoelectric drive device according to the above aspect, the rotor may be supported by a bearing, and the first portion may have a region overlapping the bearing in a plan view from the axial direction, and a region overlapping the bearing in a plan view from the radial direction.

According to the piezoelectric drive device of this aspect, it is possible to reduce the size of the piezoelectric drive device in the axial direction.

(4) In the piezoelectric drive device according to the above aspect, the transmission section may have a high-hardness part which is fixed to the second portion, and is higher in hardness than the second portion, and the vibrating part may make contact with the high-hardness part.

According to the piezoelectric drive device of this aspect, it is possible to suppress the abrasion of the rotor due to the contact with the vibrating part.

(5) In the piezoelectric drive device according to the above aspect, the high-harness part may be disposed between the vibrating part and the second portion in the axial direction.

According to the piezoelectric drive device of this aspect, it is possible to reduce the size of the piezoelectric drive device in the radial direction.

(6) In the piezoelectric drive device according to the above aspect, a part of the second portion may be disposed between the first portion and the high-hardness part to have contact with the first portion and the high-hardness part.

According to the piezoelectric drive device of this aspect, since it is possible to prevent the drive force from the vibrating part from directly reaching the first portion from the high-hardness part, it is possible to prevent the first portion from vibrating. Therefore, it is possible to more efficiently transmit the drive force from the vibrating part to the output section of the rotor.

(7) In the piezoelectric drive device according to the above aspect, a material of the high-hardness part may be a ceramic material.

According to the piezoelectric drive device of this aspect, it is possible to more surely suppress the abrasion of the rotor due to the contact with the vibrating part.

(8) In the piezoelectric drive device according to the above aspect, a material of the first portion may be one of an aluminum alloy and a resin material, and a material of the second portion may be one of stainless steel and a titanium alloy.

According to the piezoelectric drive device of this aspect, it is possible to more surely achieve both of the reduction in weight of the rotor, and the efficient transmission of the drive force from the vibrating part to the output section of the rotor.

(9) According to a second aspect of the present disclosure, there is provided a piezoelectric drive device. The piezoelectric drive device includes a rotor which has an output section configured to output a rotational force and a transmission section disposed on an outer periphery of the output section, and rotates around a rotational axis, and a vibrating part which has a piezoelectric element, and rotates the rotor due to a deformation of the piezoelectric element. The transmission section has a first portion and a second portion which are different in position in an axial direction of the rotational axis from each other, the first portion is coupled to the output section, the second portion is higher in Young's modulus than the first portion, the second portion is higher in mass per unit volume than the first portion, and the vibrating part makes contact with the transmission section at a position overlapping the second portion in a plan view from a radial direction from the output section toward the transmission section.

According to the piezoelectric drive device of this aspect, it is possible to achieve both of the reduction in weight of the rotor, and the efficient transmission of the drive force from the vibrating part to the output section of the rotor.

(10) In the piezoelectric drive device according to the above aspect, the transmission section may have a high-hardness part which is fixed to the second portion, and is higher in hardness than the second portion, and the vibrating part may make contact with the high-hardness part.

According to the piezoelectric drive device of this aspect, it is possible to suppress the abrasion of the rotor due to the contact with the vibrating part.

(11) In the piezoelectric drive device according to the above aspect, a material of the high-hardness part may be a ceramic material.

According to the piezoelectric drive device of this aspect, it is possible to more surely suppress the abrasion of the rotor due to the contact with the vibrating part.

(12) In the piezoelectric drive device according to the above aspect, a material of the first portion may be one of an aluminum alloy and a resin material, and a material of the second portion may be one of stainless steel and a titanium alloy.

According to the piezoelectric drive device of this aspect, it is possible to more surely achieve both of the reduction in weight of the rotor, and the efficient transmission of the drive force from the vibrating part to the output section of the rotor.

The present disclosure can be implemented in a variety of aspects other than the piezoelectric drive device. For example, the present disclosure can also be implemented as aspects such as a robot and a printer.

What is claimed is:

1. A piezoelectric drive device comprising:
    a rotor which has an output section configured to output a rotational force and a transmission section disposed on an outer periphery of the output section, and rotates around a rotational axis; and
    a vibrating part which has a piezoelectric element, and rotates the rotor due to a deformation of the piezoelectric element, wherein the transmission section has a first portion and a second portion which are different from each other in position in a radial direction from the output section toward the transmission section, the first portion is coupled to the output section, the second portion is higher in Young's modulus than the first portion, the second portion is higher in mass per unit volume than the first portion, and the vibrating part makes contact with the transmission section at a position overlapping the second portion in a plan view from an axial direction of the rotational axis.

2. The piezoelectric drive device according to claim 1, wherein a distance along the radial direction between the second portion and the output section is longer than a distance along the radial direction between the first portion and the output section.

3. The piezoelectric drive device according to claim 2, wherein the rotor is supported by a bearing, and the first portion has a region overlapping the bearing in a plan view from the axial direction, and a region overlapping the bearing in a plan view from the radial direction.

4. The piezoelectric drive device according to claim 1, wherein the transmission section has a high-hardness part which is fixed to the second portion, and is higher in hardness than the second portion, and the vibrating part makes contact with the high-hardness part.

5. The piezoelectric drive device according to claim 4, wherein the high-harness part is disposed between the vibrating part and the second portion in the axial direction.

6. The piezoelectric drive device according to claim 4, wherein a part of the second portion is disposed between the first portion and the high-hardness part to have contact with the first portion and the high-hardness part.

7. The piezoelectric drive device according to claim 4, wherein a material of the high-hardness part is a ceramic material.

8. The piezoelectric drive device according to claim 1, wherein a material of the first portion is one of an aluminum alloy and a resin material, and a material of the second portion is one of stainless steel and a titanium alloy.

9. A robot comprising:

a first arm;

a second arm rotates with respect to the first arm; and the piezoelectric drive device according to claim 1 configured to drive the second arm.

10. A piezoelectric drive device comprising:

a rotor which has an output section configured to output a rotational force and a transmission section disposed on an outer periphery of the output section, and rotates around a rotational axis; and a vibrating part which has a piezoelectric element, and rotates the rotor due to a deformation of the piezoelectric element, wherein the transmission section has a first portion and a second portion which are different in position in an axial direction of the rotational axis from each other, the first portion is coupled to the output section, the second portion is higher in Young's modulus than the first portion, the second portion is higher in mass per unit volume than the first portion, and the vibrating part makes contact with the transmission section at a position overlapping the second portion in a plan view from a radial direction from the output section toward the transmission section.

11. The piezoelectric drive device according to claim 10, wherein the transmission section has a high-hardness part which is fixed to the second portion, and is higher in hardness than the second portion, and the vibrating part makes contact with the high-hardness part.

12. The piezoelectric drive device according to claim 11, wherein a material of the high-hardness part is a ceramic material.

13. The piezoelectric drive device according to claim 10, wherein a material of the first portion is one of an aluminum alloy and a resin material, and a material of the second portion is one of stainless steel and a titanium alloy.

* * * * *